(12) United States Patent
van Eyndhoven et al.

(10) Patent No.: US 10,220,815 B2
(45) Date of Patent: Mar. 5, 2019

(54) QUICK FASTENING FOR FIN RAY WIPERS (71) Applicant: Robert Bosch GmbH, Stuttgart (DE)

(72) Inventors: Adriaan van Eyndhoven, Stuttgart (DE); Michael Weiler, Buehl (DE); Peter Deak, Budapest (HU); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 15/328,538

(22) PCT Filed: Jul. 10, 2015

(86) PCT No.: PCT/EP2015/065803
§ 371 (c)(1),
(2) Date: Jan. 24, 2017

(87) PCT Pub. No.: WO2016/012270
PCT Pub. Date: Jan. 28, 2016

(65) Prior Publication Data
US 2017/0210349 A1  Jul. 27, 2017

(30) Foreign Application Priority Data
Jul. 24, 2014  (DE) .................. 10 2014 214 569

(51) Int. Cl.
*B60S 1/34* (2006.01)
*B60S 1/38* (2006.01)
*B60S 1/40* (2006.01)

(52) U.S. Cl.
CPC .......... *B60S 1/3801* (2013.01); *B60S 1/3427* (2013.01); *B60S 1/3431* (2013.01); *B60S 1/3436* (2013.01);
(Continued)

(58) Field of Classification Search
CPC ...... B60S 1/3436; B60S 1/3431; B60S 1/345; B60S 1/3452; B60S 1/3454; B60S 1/3463;
(Continued)

(56) References Cited

U.S. PATENT DOCUMENTS

| | | | |
|---|---|---|---|
| 3,387,316 A * | 6/1968 | Pearse | B60S 1/32 15/250.34 |
| 5,613,268 A | 3/1997 | Scorsiroli | |
| 2016/0159322 A1* | 6/2016 | Weiler | B60S 1/3411 15/250.32 |

FOREIGN PATENT DOCUMENTS

| | | |
|---|---|---|
| CN | 101301882 A | 11/2008 |
| CN | 103847696 A | 6/2014 |

(Continued)

OTHER PUBLICATIONS

Machine translation of description portion of French publication 2382357, published Sep. 1978.*
(Continued)

*Primary Examiner* — Gary K. Graham
(74) *Attorney, Agent, or Firm* — Michael Best & Friedrich LLP (57) ABSTRACT

The invention relates to a window-wiping device for a vehicle having a fastening element fastened to a drive shaft, in particular a motor vehicle. The window-wiping device comprises a wiper blade having an elongate upper part, which is at least partially flexible, an elongate lower part, which is at least partially flexible, a plurality of connecting elements for connecting the upper part and the lower part, wherein the connecting elements are spaced apart from each other along a longitudinal extent of the wiper blade, and wherein the connecting elements are designed to enable a motion of the upper part and of the lower part in relation to each other with a motion component along a longitudinal (Continued)

extent of the wiper blade, and a wiper-blade-side fastening part, wherein the wiper-blade-side fastening part can be detachably connected by means of a linear motion on the fastening element, and the wiper-blade-side fastening part can be connected to the fastening element in such a way that a rotational position about an axis perpendicular to the longitudinal extent of the wiper blade and perpendicular to the linear motion is defined by a support and a further contact point.

17 Claims, 8 Drawing Sheets

(52) U.S. Cl.
CPC ........... *B60S 1/3452* (2013.01); *B60S 1/3463* (2013.01); *B60S 1/4074* (2013.01); *B60S 1/3465* (2013.01); *B60S 1/3475* (2013.01); *B60S 2001/3812* (2013.01)

(58) Field of Classification Search
CPC .... B60S 1/3475; B60S 1/3477; B60S 1/3427; B60S 1/3801; B60S 1/3465
USPC .................. 15/250.34, 250.351, 250.352
See application file for complete search history.

(56) References Cited

FOREIGN PATENT DOCUMENTS

| | | | |
|---|---|---|---|
| DE | 102004063178 | * | 7/2006 |
| DE | 102013214064 | * | 5/2014 |
| DE | 102013226408 A1 | | 6/2015 |
| FR | 1265101 | * | 5/1961 |
| FR | 2382357 | * | 9/1978 |
| FR | 3013012 A1 | | 5/2015 |
| FR | 3013014 A1 | | 5/2015 |
| GB | 880671 | * | 10/1961 |
| WO | 99/37513 | * | 7/1999 |
| WO | 2006/032390 | * | 3/2006 |
| WO | 2007/033823 | * | 3/2007 |
| WO | 2007/071671 | * | 6/2007 |

OTHER PUBLICATIONS

International Search Report for Application No. PCT/EP2015/065803 dated Oct. 8, 2015 (English Translation, 2 pages).

* cited by examiner

QUICK FASTENING FOR FIN RAY WIPERS

BACKGROUND OF THE INVENTION

The invention relates to a window wiper device for a vehicle, in particular a motor vehicle.

Windshield wiper devices typically have a wiper arm or wiper lever, wherein a wiper blade is moved on the windshield of a motor vehicle. Here, the wiper blade is moved between a first reversal point and a second reversal point. For this purpose, the wiper arm is connected by way of the drive shaft to a wiper motor. In particular on windshields with intense changes in curvature and in the event of large temperature fluctuations, the wiper blade easily loses contact with the windshield. This can give rise, in particular in the case of intensely curved windshields, to non-wiped wiping areas, and/or to smearing.

Since a wiping process must be optimized with regard to a multiplicity of parameters, such as for example an amount of rain falling on the windshield, a possible snow load on the windshield, the speed of the vehicle and associated wind pressure on the wiper arm, smearing cannot be reliably prevented simply by adapting the pressure of the wiper arm on the windshield. It is therefore a requirement to further improve windshield wiper devices.

For the improvement, there is a multiplicity of boundary conditions that must additionally be taken into consideration. Here, it is also a requirement to ensure or improve the handling or user-friendliness.

SUMMARY OF THE INVENTION

It is the object of the present invention to provide for reliable, substantially smear-free wiping of a window of a vehicle, and/or to provide an improved window wiper device with improved handling, in particular simple mounting and dismounting.

In one embodiment, a window wiper device for a vehicle having a fastening element fastened to a drive shaft, in particular a motor vehicle, is provided. The window wiper device comprises a wiper blade having an elongate upper part which is at least partially of flexible form, an elongate lower part which is at least partially of flexible form, multiple connecting elements for connecting the upper part and the lower part, wherein the connecting elements are spaced apart from one another along a longitudinal extent of the wiper blade, and wherein the connecting elements are designed to permit a movement of the upper part and of the lower part relative to one another with a movement component along a longitudinal extent of the wiper blade, and a wiper-blade-side fastening part, wherein the wiper-blade-side fastening part is detachably connectable to the fastening element by way of a linear movement, and the wiper-blade-side fastening part is connectable to the fastening element such that a rotational position about an axis perpendicular to the longitudinal extent of the wiper blade and perpendicular to the linear movement is defined by a support bearing and by a further contact point.

In a further embodiment, a method for the mounting of a window wiper device is provided. The method comprises providing a window wiper device, in particular according to one of the embodiments described here, and pushing the wiper-blade-side fastening part onto the fastening element in a linear movement in order to realize a non-positively locking and/or positively locking engagement action between the wiper-blade-side fastening part and the fastening element.

Preferred embodiments and particular aspects of the invention will emerge from the dependent claims, from the drawings and from the present description.

According to the embodiments of the invention described here, it is possible for a window wiper device for vehicles to be mounted easily, and with improved boundary conditions, in a particularly simple manner and for a multiplicity of different fields of use. Furthermore, the embodiments of the invention permit reliable, substantially smear-free wiping of a window of a vehicle.

In one embodiment, a window wiper device for a vehicle having a fastening element fastened to a drive shaft, in particular a motor vehicle, is provided. The window wiper device comprises a wiper blade having an elongate upper part which is at least partially of flexible form, an elongate lower part which is at least partially of flexible form, multiple connecting elements for connecting the upper part and the lower part, wherein the connecting elements are spaced apart from one another along a longitudinal extent of the wiper blade, and wherein the connecting elements are designed to permit a movement of the upper part and of the lower part relative to one another with a movement component along a longitudinal extent of the wiper blade, and a wiper-blade-side fastening part, wherein the wiper-blade-side fastening part is detachably connectable to the fastening element by way of a linear movement, and the wiper-blade-side fastening part is connectable to the fastening element such that a rotational position about an axis perpendicular to the longitudinal extent of the wiper blade and perpendicular to the linear movement is defined by a support bearing and by a further contact point. In this way, it is possible for a one-click fastening concept to be provided, in the case of which, in particular, a rotational movement in the direction of the window is not overdefined.

In a further preferred embodiment, the wiper-blade-side fastening part has a cavity and has an opening arranged in a side wall of the cavity, wherein in particular, the opening is arranged in a side wall, which faces toward a connecting element, of the cavity. By way of such an embodiment, the wiper blade device and the wiper blade can be manufactured particular easily.

In a further preferred embodiment, the window wiper device furthermore comprises the fastening element, wherein the fastening element has an actuating device which is designed to releasably connectably realize a non-positively locking and/or positively locking engagement action. Since the actuating device is provided not on the wiper-blade-side fastening part but on the spindle-side fastening element, the wiper blade device or the wiper blade can be designed in a particularly simple manner. For example, in further optional embodiments, the wiper-blade-side fastening part may be formed in one piece, and/or the wiper-blade-side fastening part may be designed to be provided by way of an injection molding process, in particular by way of an injection molding process with one step.

In a further preferred embodiment, the wiper-blade-side fastening part may have one or more guide elements arranged in the cavity and the contact point. By way of the guide elements, a position in a direction which is independent of a rotation relative to the fastening element about an axis perpendicular to the longitudinal extent of the wiper blade and perpendicular to the linear movement can be predefined. The contact point may serve for the definition of the rotational position.

In a further preferred embodiment, the wiper-blade-side fastening part may be formed so as to be free from metal and/or without movable elements. This may likewise serve for realizing a simple design. For example, a wiper blade can be produced inexpensively as a replacement part.

In a further preferred embodiment, the wiper-blade-side fastening part may be designed to permit a rotation relative to the fastening element about an axis perpendicular to the longitudinal extent of the wiper blade and perpendicular to the linear movement relative to the fastening element, wherein in particular, the support bearing forms a fulcrum of a lever for the rotation. In this way, it is possible to provide a defined contact pressure of a wiper lip against a window. For example, in further embodiments, the rotation of the fastening part relative to the fastening element can be restricted to an angle range of 30° or less. Said rotation is consequently not one which corresponds to a hinging of the wiper blade away from the window.

In a further preferred embodiment, the multiple connecting elements may be connected at multiple upper connecting positions to the upper part and at multiple lower corresponding connecting positions to the lower part, wherein, during the movement of the upper part and of the lower part relative to one another, the spacing between an upper connecting position and a corresponding lower connecting position is substantially constant, in particular is constant with a deviation of ±1 mm. In this way, it is possible for a transmission of force between the upper part and the lower part to be provided, which makes it possible to realize a window wiper device which operates in accordance with the fin-ray principle.

In a further preferred embodiment, the window wiper device may furthermore comprise a force generating element, in particular a spring, wherein the force-generating element, in particular the spring, is designed to effect the rotation relative to the fastening element about an axis perpendicular to the longitudinal extent of the wiper blade and perpendicular to the linear movement relative to the fastening element. In this way, the force with which a wiper lip acts on the window can be adapted, for example if said force varies in an undesired manner on the basis of temperature fluctuations and other influences. Furthermore, integrated compensation for the installation and/or for tolerances can be provided. For example, a creep of the material can be compensated by way of the force element. Furthermore, a translational height compensation or a rotational compensation can be realized.

In a further preferred embodiment, the actuating device may be arranged between a head part and one of the multiple connecting elements. In this way, it is possible to provide an integrated wiper arm or wiper blade mounting and dismounting with a simple ergonomic movement.

In a further preferred embodiment, the actuating device may have two pushbuttons on the sides along the longitudinal extent of the window wiper device. In this way, it is possible to provide alternative ergonomic handling.

In a further embodiment, a method for the mounting of a window wiper device is provided. The method comprises providing a window wiper device, in particular according to one of the embodiments described here, and pushing the wiper-blade-side fastening part onto the fastening element in a linear movement in order to realize a non-positively locking and/or positively locking engagement action between the wiper-blade-side fastening part and the fastening element. It is possible to provide a fastening concept for the mounting and dismounting of a window wiper device, in particular with a one-click principle. For example, in a further preferred embodiment, it may be the case that, during the pushing-on movement, the actuating device is guided into the opening.

BRIEF DESCRIPTION OF THE DRAWINGS

Exemplary embodiments of the invention are illustrated in the figures and will be described in more detail below. In the figures.

DETAILED DESCRIPTION

Below, unless stated otherwise, the same reference designations are used for identical elements and elements of identical action.

Figure 1A:
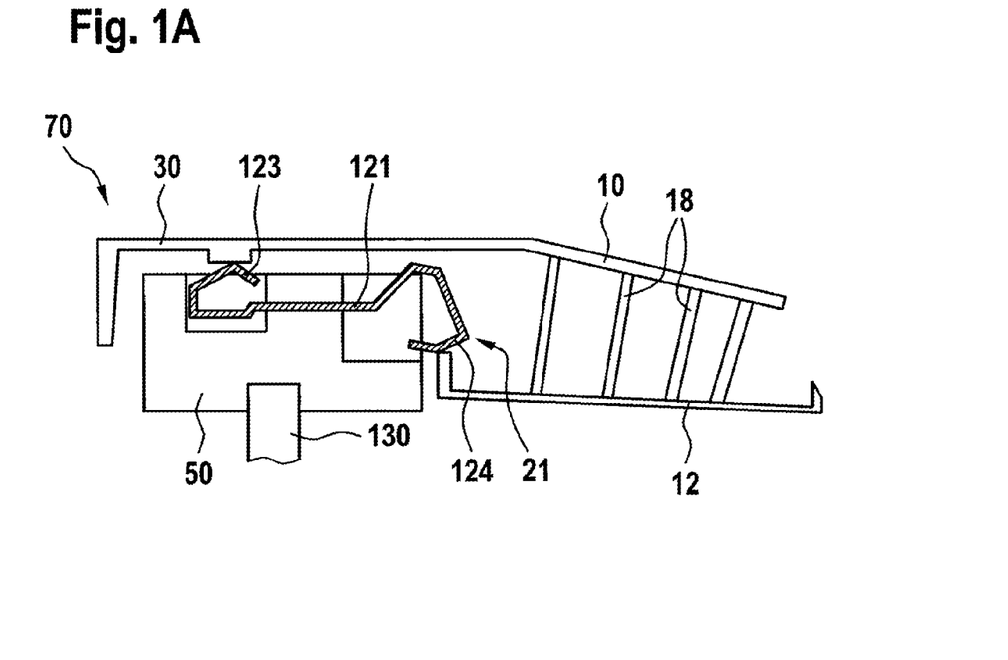
FIG. 1A is a schematic illustration of a part of a wiper blade in a longitudinal sectional view according to embodiments of the invention, wherein a wiper-blade-side fastening part is fastened to a fastening element.

FIG. 1 is a schematic illustration of a detail of a wiper blade 2 of a window wiper device for a vehicle, in particular for a motor vehicle. The wiper blade 2 comprises an elongate upper part 10 and an elongate lower part 12 which are at least partially of flexible form. Furthermore, multiple connecting elements 18 for connecting the upper part 10 and the lower part 12 are provided, wherein the connecting elements 18 are spaced apart from one another along a longitudinal extent 8 of the wiper blade 2. The connecting elements 18 are designed to permit a movement of the upper part 10 and of the lower part 12 relative to one another with a movement component along a longitudinal extent of the wiper blade 2. Here, the connecting elements are connected to the upper part 10 at a respective upper connecting position and to the lower part 12 at a respective lower connecting position.

For example, in each case one rotary joint is provided at the connecting positions. In the event of a movement of the upper part 10 and of the lower part 12 relative to one another, the spacing of an upper connecting position relative to a lower connecting position on the same connecting element substantially does not change, that is to say that spacing is constant with deviations of for example ±1 mm, in particular ±0.3 mm.

Furthermore, the wiper blade 2 has a head end 70. At the head end there is provided a fastening part 30, that is to say a wiper-blade-side fastening part 30. Along the longitudinal extent of the wiper blade 2, the spacing between the upper part 10 and the lower part 12 becomes smaller proceeding from the head end, at least in regions of the longitudinal extent of the wiper blade or over a predominant part of the longitudinal extent of the wiper blade. Proceeding from the head end, the height of the wiper blade tapers in wedge-shaped fashion in regions, or becomes smaller in regions of the longitudinal extent. For example, in embodiments, for a multiplicity of the connecting elements, the length of the connecting elements may be provided such that the connecting elements provided at the head end are longer than those at the opposite side of the wiper blade along the longitudinal extent.

Owing to these characteristics, a wiper blade can be provided which functions in accordance with the fin-ray principle. Said window wiper devices typically have no joint for the purposes of lifting the wiper blade or a wiper lip from a window, for example a window of a motor vehicle. For example, the wiper blade 2 is released from a fastening element 50, which is provided on a drive shaft 130, by way of a quick-action fastener (Quickfix).

FIG. 1A shows the wiper-blade-side fastening part 30 and the fastening element 50. For the attachment of the wiper blade 2 or for the detachment of the wiper blade, a translational movement is performed which may for example be oriented substantially along the axis of the drive shaft 130. Said movement may possibly enclose an angle of ±15° or less with the drive shaft. A torsion or rotation of the fastening part 30 about an axis parallel to the longitudinal extent of the wiper blade may be limited or prevented by way of guide elements in the fastening part 30 or a fastening element 50.

In embodiments of the present invention, a rotational position about an axis perpendicular to the longitudinal extent of the wiper blade and perpendicular to the axis of the drive shaft (or perpendicular to the linear mounting direction) is defined by a first contact point and a second contact point between the wiper-blade-side fastening part 30 and in the fastening element 50. The position of the wiper blade 2 is thus defined without being overdeterminate.

In embodiments of the invention, the first contact point is provided by a support bearing, that is to say a fulcrum, of a lever, which is provided between the axis of rotation of the drive shaft 130 and a connecting element 18, and an abutment, which is provided for example on the opposite side of the drive shaft 130.

FIG. 1A shows a spring element 121. The spring element 121 forms, by way of a part of the lower part 12, a support bearing. Furthermore, the spring element 121 comprises an abutment spring 123 which provides the abutment for defining the rotational position. In further embodiments, it is furthermore the case that an actuating device 21 is provided in the fastening element 50, such that the fastening part detachably connected to the fastening element forms a non-positively locking and/or positively locking engagement. The actuating device 21 may, as a mechanism, utilize the spring element 121.

Figure 1B:
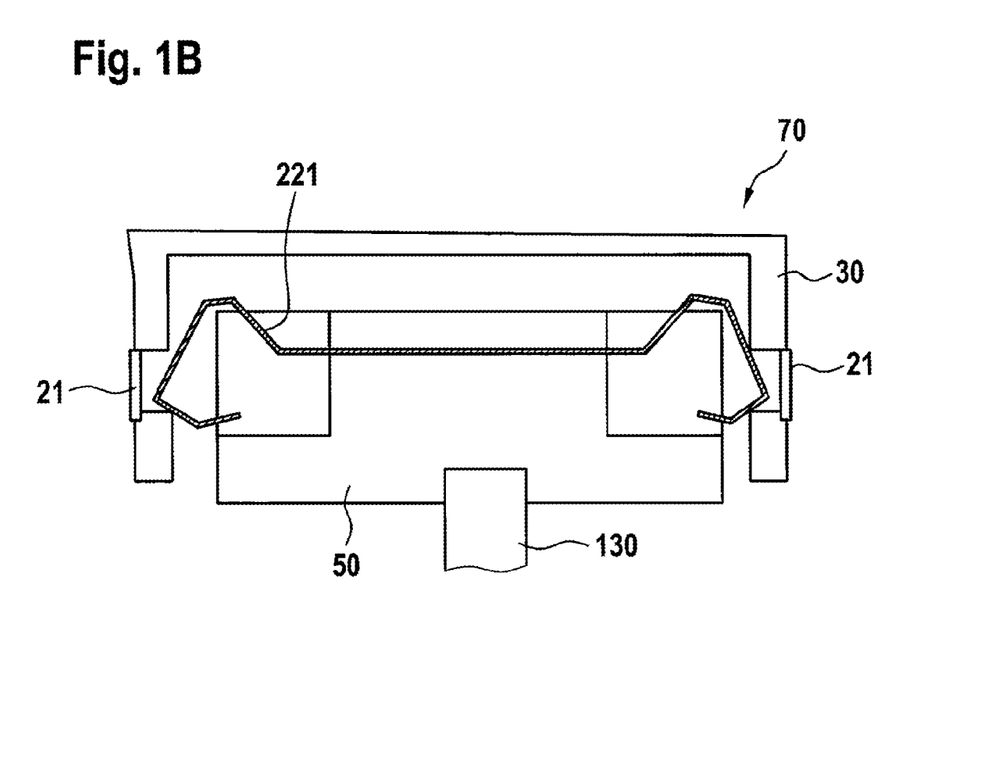
FIG. 1B is a schematic illustration of a wiper blade in a cross-sectional view according to an embodiment of the invention, wherein a wiper-blade-side fastening part is fastened to a fastening element.

FIG. 1B shows a further embodiment of the invention. FIG. 1B shows a cross section perpendicular to the longitudinal extent of a wiper blade 2, wherein a region of the head end 70 is illustrated. The spring element 221 illustrated in FIG. 1B is designed to provide an actuating device 21 by way of two pressure positions to the right and to the left on the fastening part 30. The support bearing and the abutment are not illustrated in FIG. 1B. For example, the pressure positions may be covered by soft caps (for example TPU) which are integrated in the wiper-blade-side fastening part.

Figure 2:
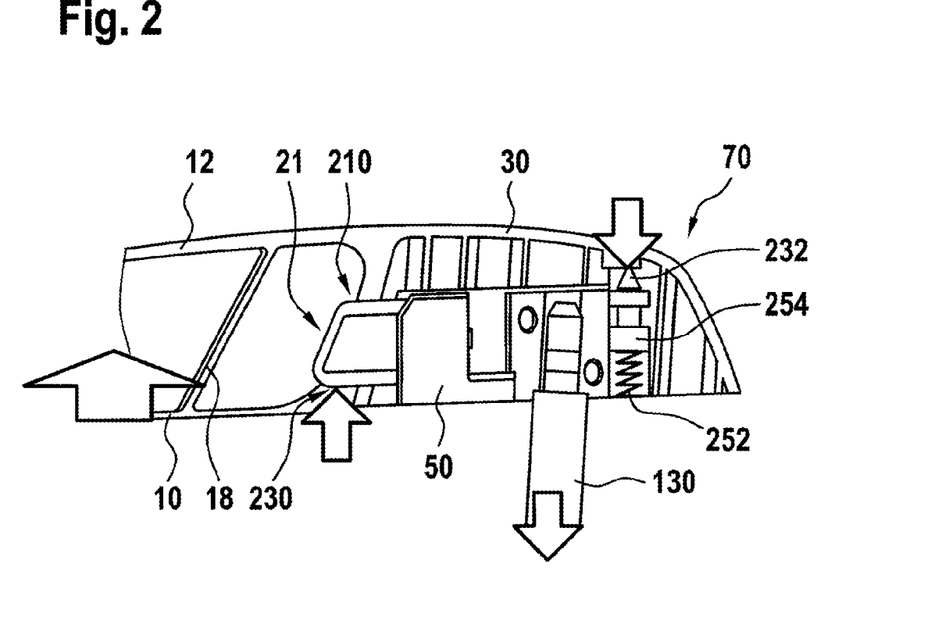
FIG. 2 is a schematic illustration of a part of a wiper blade in a longitudinal sectional view according to an embodiment of the invention, wherein a wiper-blade-side fastening part is fastened to a fastening element.

FIG. 2 shows a further detail of a wiper blade 2, wherein, on the head end 70 of the wiper blade 2, there is formed a fastening part 30, that is to say a wiper-blade-side fastening part, which is detachably connected to a fastening element 50. The fastening element 50 is provided on a drive shaft 130. The fastening element 50 is for example clamped onto the drive shaft, such that a rotation of the drive shaft 130 is transmitted to the fastening element 50. Said rotation is in turn transmitted to the fastening part 30, such that the wiper blade 2 rotates on a window of a vehicle, for example of a motor vehicle.

The wiper blade 2 comprises an upper part 12 and a lower part 10 and multiple connecting elements 18. The fastening element 30 comprises a cavity and an opening 210. The cavity is designed to receive the fastening element 50. The opening 210 is designed such that, in the mounted state, an actuating device 21 can be inserted into the opening. A lower region of the opening 210 forms the support bearing 230, wherein the lower region is that region of the opening 210 which faces toward a window.

In embodiments of the present invention, the abutment 232 that is provided on the fastening element 50 may be provided on a movable element 254 for the purposes of defining the rotational position by way of a corresponding position of the fastening part 30. The movable element 254 may for example be a pin which is movable in a guide. The movement of the movable element 254 may be defined by a spring 252 which imparts a force for the abutment 232. If for example a force which acts on the lower part 10 during the wiping by the wiper blade 2 is intensified, it is the case that, by way of the lever, the abutment 232 is moved downward, that is to say the spring 252 is subjected to a more intense force. The movable element 254 moves downward. The abutment 232 has, in this case, a variable position, wherein a lever exists about the support bearing 230.

As described above, by way of the support bearing and an abutment, that is to say a first contact point and a second contact point, a rotational position about an axis perpendicular to the longitudinal extent of the wiper blade and perpendicular to the axis of the drive shaft is provided in a manner dependent on a force on the wiper blade. In a manner dependent on the force, the wiper blade can rotate about an axis perpendicular to the longitudinal extent of the wiper blade and perpendicular to the axis of the drive shaft.

In some embodiments that may be combined with other embodiments, a force of 2 Newtons to 10 Newtons, for example of approximately 5 Newtons, acting on the underside of the wiper blade or on a wiper lip fastened to the underside can correspond, by way of a lever ratio, to a spring force of 8 Newtons to 40 Newtons, approximately 20 Newtons.

In yet further embodiments that may be combined with other embodiments, a fastening element 50 may also be configured without a spring. Here, by way of the abutment 232, a fixed rotational position is provided. The movable element 254 becomes a fixed element. In yet further embodiments, the position of the abutment may be provided by way of different lengths of said fixed element or by way of different adapters or attachments on the fixed element. By way of this predefined variation of the abutment or of the contact point, it is for example possible for the use of a window wiper device to be adapted to a specific vehicle type.

Figure 3A:
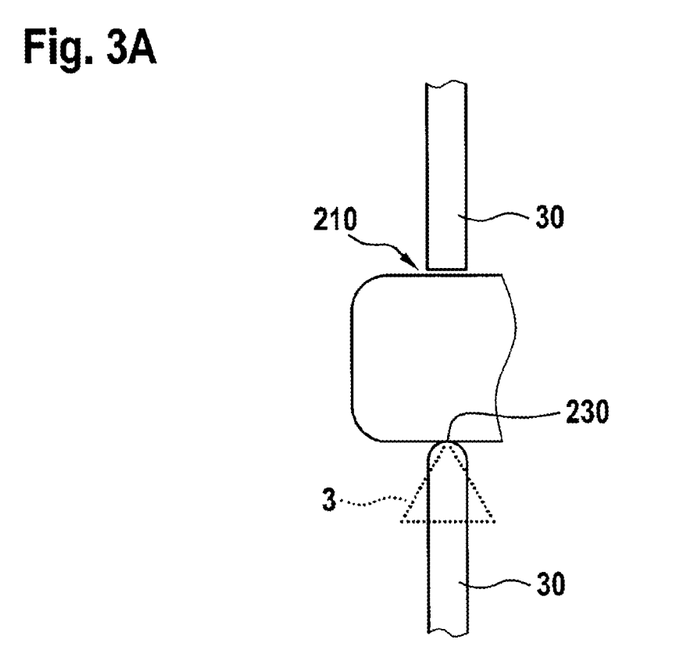
FIG. 3A is a schematic illustration of an engagement of a part of a fastening element with a part of a wiper-blade-side fastening part.

FIG. 3A shows further details of the support bearing 230 which is illustrated by way of example by a triangle 3. For this purpose, a part of the fastening part 30 is shown in a detail. Furthermore, the actuating device 21 provides a part of the fastening element 50 which forms an engagement action with the fastening part 30. The fastening part 30 has an opening 210. The actuating device 21 can be inserted into the opening 210 in order to form a non-positively locking and/or positively locking engagement action. For the release of the fastening part 30 from the fastening element 50, the actuating device 21 is pressed in order to be moved through the opening 210 in the fastening part 30.

An underside of the opening 210 of the fastening part 30 forms the support bearing 230 for a part of the fastening element 50, for example the actuating device 21. In some embodiments, the edge of the fastening part 30 on the underside of the opening 210 may be provided with a curvature or a radius such that a defined position of the support bearing can be provided. Even in the case of a finite magnitude of the wall thickness of the fastening part 30, a defined lever position can be provided here. For example, the wall thickness of the fastening part 30 may amount to 0.5 to 3 mm, in particular 1 to 2 mm.

At the top side of the opening 210, a gap may be provided between the part of the fastening element 50, for example of the actuating device 21, and the fastening part 30 in order that a rotational position about an axis perpendicular to the longitudinal extent of the wiper blade and perpendicular to the axis of the drive shaft at the top side of the opening 210 is not restricted. By way of the gap, the rotational position is not overdefined.

Figure 3B:
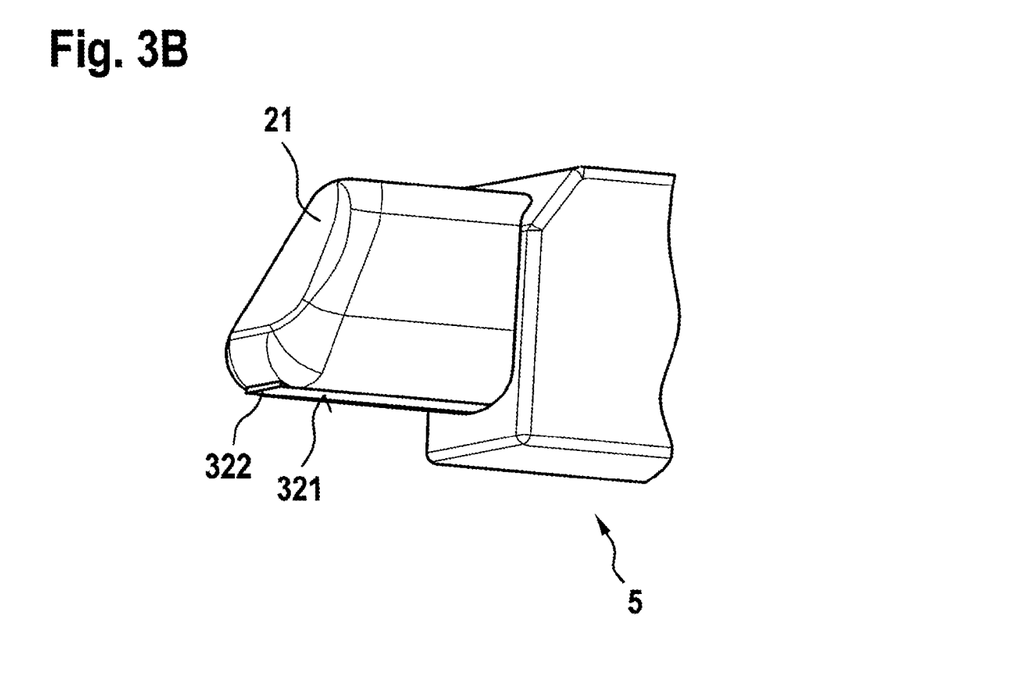
FIG. 3B is a schematic illustration of a detail of a fastening element.

FIG. 3B shows a detail of the fastening element 50, wherein the actuating device 21 and in particular the underside of the actuating device 21 is illustrated. On the underside of the actuating device 21 there is provided an enlarged face 321 with an edge 322, that is to say a face is provided which is larger on the underside in relation to a face with a homogeneous profile of the surface. The enlarged face 321 or the edge 322 serves to reduce the likelihood of the actuating device 21 sliding out of the opening 210 of the fastening part 30 in an undesired manner when the fulcrum of the support bearing or of the lever passes into the region of the curved edge of the actuating device, that is to say of the lower edge, with the radius, of the actuating device 21. In typical embodiments, the actuating device, at the end facing toward the opening in the wiper-blade-side fastening part, has, for example with the exception of the enlarged face 321, rounded edges or a radius of 2 mm and greater at the edges in order to permit smooth mounting and dismounting.

Figure 3C:
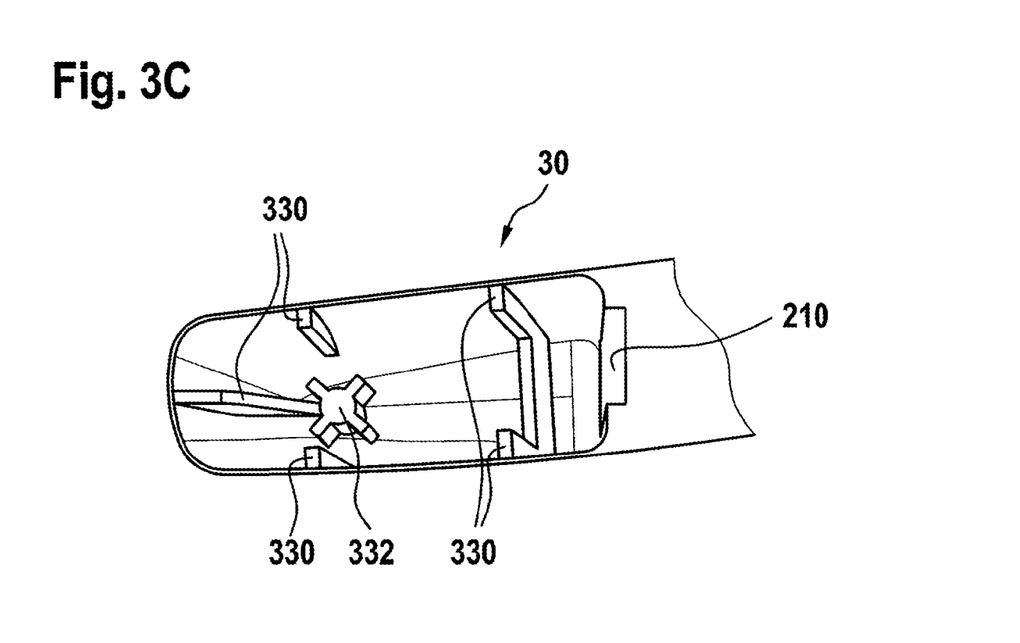
FIG. 3C is a schematic illustration of the wiper-blade-side fastening part.

FIG. 3C illustrates further features, details and aspects of the fastening part 30 according to embodiments of the invention that may be optionally provided. The fastening part 30 comprises an opening 210 which is partially illustrated in the cross section in FIG. 3C. Furthermore, the fastening part 30 comprises a cavity. One or more guide elements 330 may be provided in the cavity. In some embodiments, a contact position 332 for the abutment may be provided in a corresponding fastening element 50.

In some embodiments, the fastening part 30 or the wiper blade 20 may be provided by virtue of mechanical elements such as springs, spring elements, actuating device and/or metallic elements being provided not in the fastening part 30 but in a corresponding fastening element 50. The fastening part 30 is thus designed to be provided in an injection molding process, in particular in a single injection molding process or in an injection molding process with one step. For example, the fastening element 30 is composed of only one material. The fastening element 30 has an opening 210 and a cavity. It is optionally possible for formations such as guide rails or a contact position to be provided in the single material.

FIGS. 4A to 4D show the fastening of a wiper blade 2 by way of the fastening device, that is to say a Quickfix, according to embodiments of the present invention. The wiper blade 2 has, on the head end 70, a fastening part 30. The fastening part comprises a cavity and an opening 210. A fastening element 50 is provided on the drive shaft 130. The fastening element 50 comprises, for example, the actuating device 21.

Figure 4A:
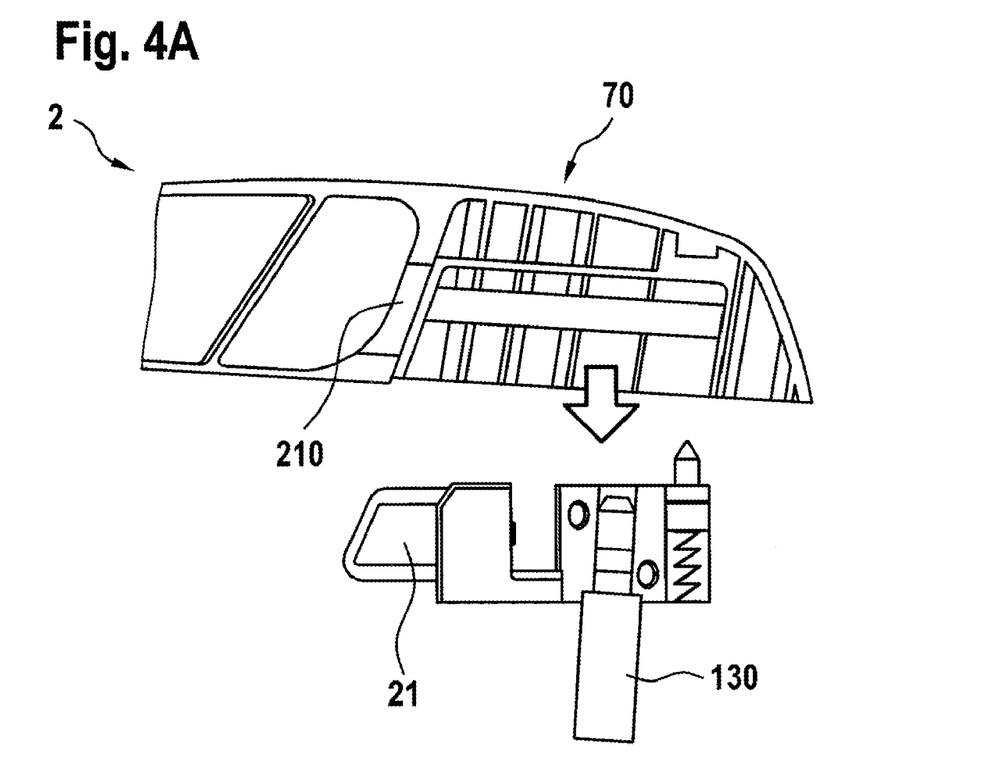
FIGS. 4A to 4D are schematic illustrations of the mounting of a wiper blade on a fastening element.

As illustrated by the arrow in FIG. 4A, the wiper blade is mounted by way of a translational movement or a linear movement. Here, the fastening part 30 is placed linearly onto the fastening element 50. In typical embodiments, the linear movement runs substantially along or parallel to the axis of the drive shaft 130. The direction of the linear movement may however also deviate, for example in a small angle range, from the axis of the drive shaft. The angle range may for example encompass angles of 10° or less.

Figure 4B:
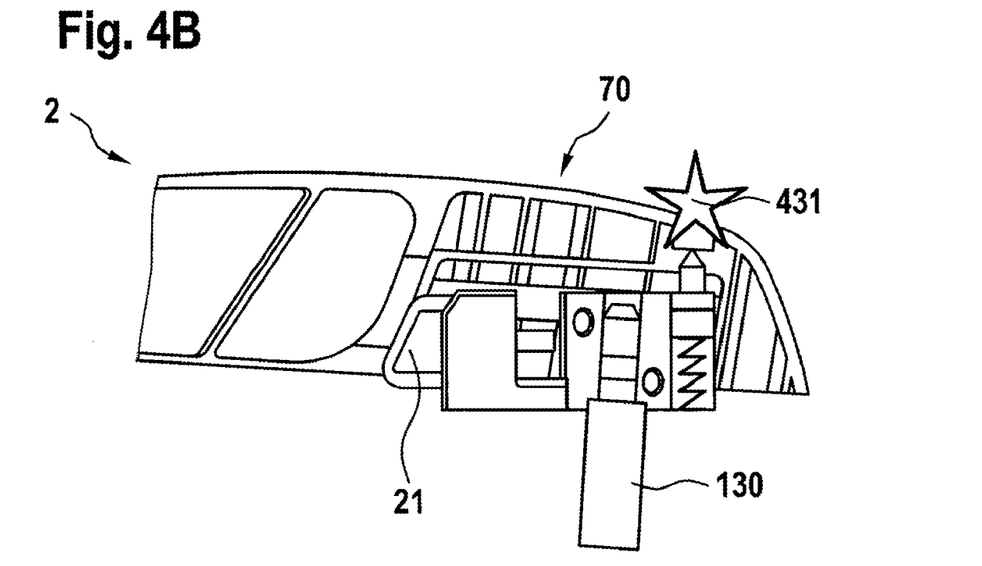
Figure 4C:
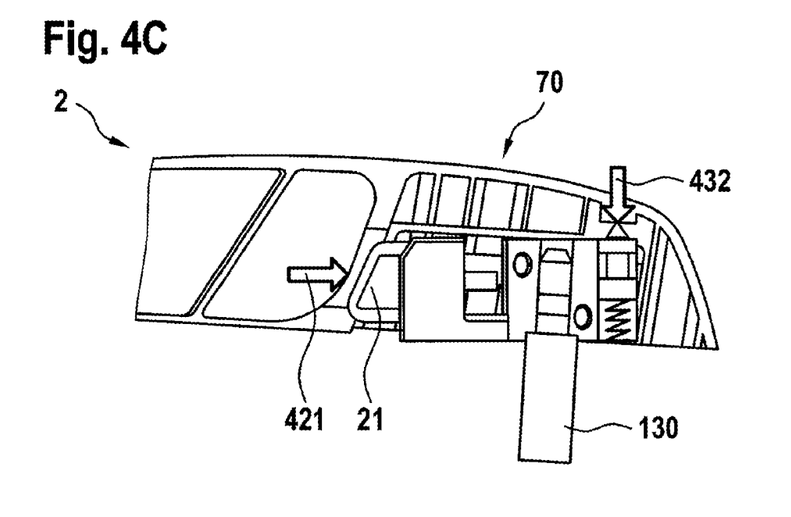

FIG. 4B shows how the abutment of the fastening element 50 comes into contact with the corresponding contact position on the fastening part 30. This is schematically illustrated by way of a start 431. The actuating device 21 is, in FIG. 4B, already moving into a region of the opening 210. During a further progression of the translational movement as illustrated in FIG. 4C, the actuating device 21 is pressed (see arrow 421). The pin whose end forms the abutment is likewise moved (see arrow 432).

Figure 4D:
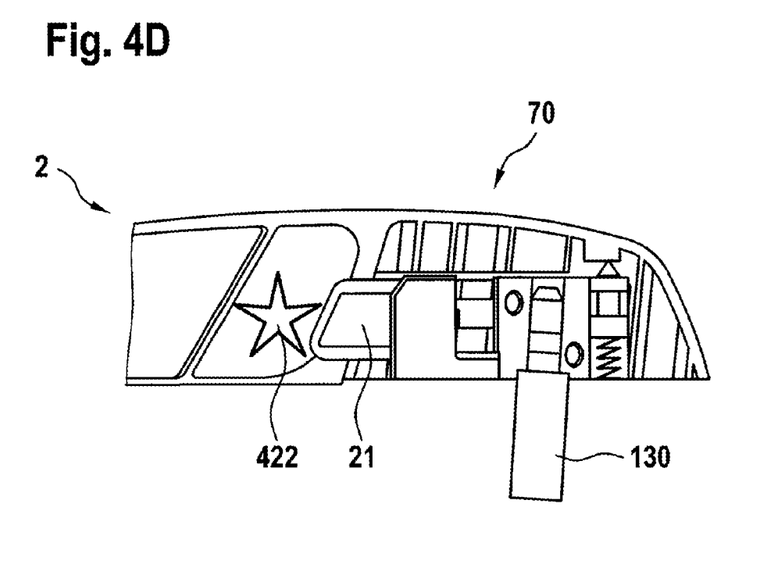

For the engagement action, the actuating device 21 moves into the opening 210. Said movement may be provided for example by way of a spring element. The engagement is schematically illustrated by star 422. Between the actuating device 21 and a lower edge of the opening 210, a support bearing, that is to say for example a fulcrum of a lever, is provided between the fastening part 30 and the fastening element 50. The abutment between the start of the fastening element 50 and the contact position in the fastening part 30 forms a second contact point. Here, rotational position is defined about an axis perpendicular to the longitudinal extent of the wiper blade and perpendicular to the axis of the drive shaft 130, in particular without being overdefined.

A description will be given below of aspects of an exemplary window wiper device for which the embodiments described herein of the window wiper device, in particular the described mounting and dismounting with a wiper-blade-side fastening part and a fastening element, are advantageous. The wiper arm or the wiper blade can in this case be provided in a particularly simple manner, wherein, for example, the wiper or the window wiper device which is mounted on a vehicle is composed exclusively of plastic. For example, the window wiper device may be provided without metal parts and/or without mechanical elements.

In some embodiments of the present invention, a spring may be provided in the actuating device 21 and/or for the abutment 232 (see 252). Furthermore, in embodiments, it is possible (see FIG. 1A) for one or both of the spring elements to be provided by way of a spring element 121, for example a spring plate. In this way, it is possible to realize more cost-effective production.

Figure 5A:
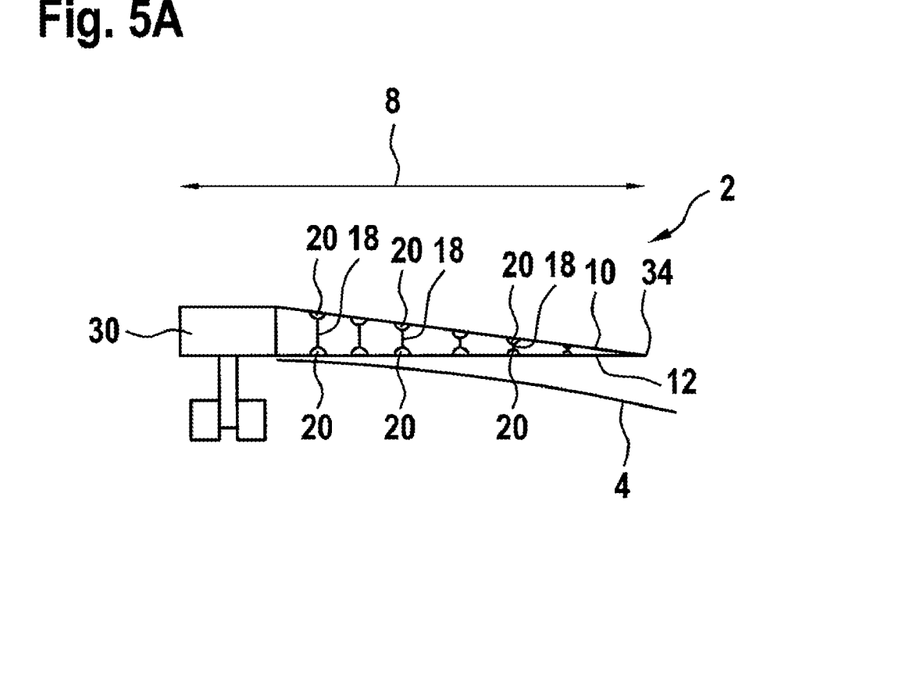
FIG. 5A is a schematic illustration of a further exemplary embodiment of a window wiper device according to the invention in the form of a wiper arm with integrated wiper blade in a basic position.
Figure 5B:
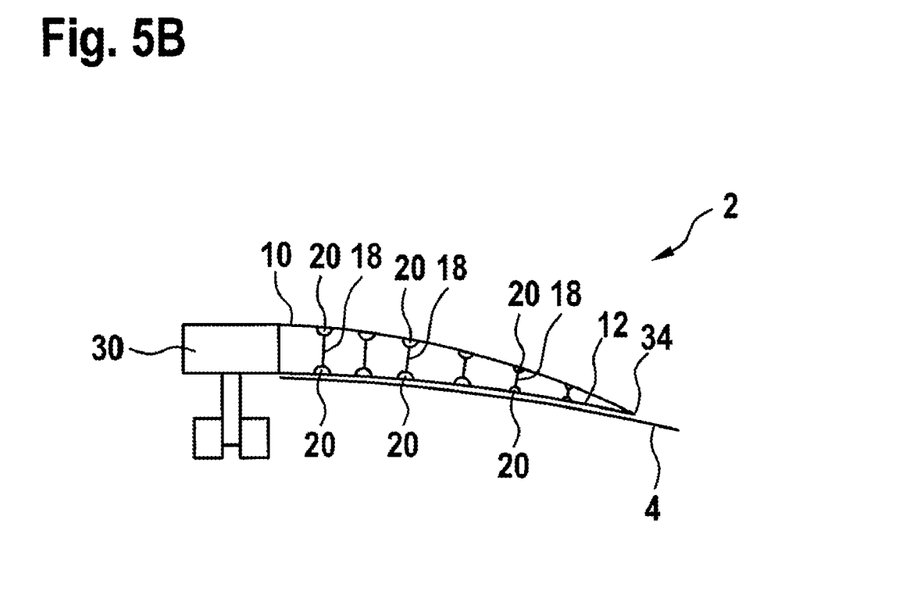
FIG. 5B is a schematic illustration of the wiper arm with integrated wiper blade as per FIG. 5A in a position placed against a window.

FIGS. 5A and 5B are schematic illustrations of a wiper blade 2 in a basic position and in a position placed against a window according to embodiments of the window wiper device of the disclosure. Here, fin-ray wipers are described, for which a compensation layer 13 according to embodiments described here is particularly expedient. The compensation layer 13 is not illustrated again in FIGS. 5A, 5B, 6 and 7, and may also be provided in these embodiments as described above. The wiper blade 2 serves for wiping a window 4 of a vehicle, which is for example a motor vehicle, in particular an automobile. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are, or may be designed as, flexible beams. It is likewise possible for only in each case one part of the upper part 10 and/or of the lower part 12 to be designed to be flexible. In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum flexural stiffness is thus realized.

The upper part 10 and the lower part 12 are fastened to a fastening part 30. The window wiper device may be connected by way of the fastening part 30 for example to a Quickfix fastening on the vehicle. At the side situated opposite the fastening part 30 along the longitudinal extent of the window wiper device, the upper part 10 and the lower part 12 are connected at a connecting position 34. The connecting elements are designed such that the spacing of the connecting position to the upper part and the spacing of the connecting position to the lower part changes by at most ±1 mm, in particular by at most +0.3 mm (for example as a result of thermal expansion and/or tension and compressive loading). The connecting elements may thus substantially be of inelastic form, or the effect of the connecting elements is based on their transmission of force between upper part and lower part, and not on the elasticity.

The upper part 10 and the lower part 12 are connected to one another by way of connecting elements 18. The connecting elements 18 are fastened by way of rotary joints 20 to inner longitudinal sides, which face toward one another, of the upper part 10 and of the lower part 12. Here, the rotary joints 20 are typically hinges. In particular, the rotary joints 20 may be in the form of film hinges. This is advantageous in particular if the upper part 10, lower part 12 and/or connecting elements 18 are produced from a plastics material or are lined with a suitable plastics material.

In typical embodiments described here, which may be combined with other embodiments described here, a rotary joint is selected from the group comprising: a hinge, a film hinge, a narrowing of the material in order to realize relatively low stiffness along a torsional axis, a joint with an axis of rotation, a means for connecting the upper part to the connecting element or for connecting the lower part to the connecting element, which means permits the displacement of the lower part relative to the upper part along the longitudinal extent, etc.

Embodiments in which the joint is provided by film hinges thus provide a very simple way of providing the joints for a fin-ray wiper. The wiper blade 2 may be provided in unipartite, in particular ready-from-the-mold form. In typical embodiments, the film hinges exhibit high extensibility. This may be achieved for example by way of a material selected from the group PP, PE, POM and PA. Alternatively, the film hinges may be produced from one or more materials from a group comprising: TPE (thermoplastic elastomer), for example TPE-S, TPE-O, TPE-U, TPE-A, TPE-V and TPE-E.

The connecting elements 18 are spaced apart from one another along the longitudinal extent of the wiper blade 2. The spacings are advantageously less than 50 mm, in particular less than 30 mm. In this way, it is possible to ensure a particularly high level of flexibility of the window wiper device, in particular of its lower part, and good adaptation to the curvature and changes in curvature of the window to be wiped.

FIG. 5B is a schematic illustration of the wiper blade 2 as per FIG. 5A in a position placed against the window 4. Since the window 4 has a curvature, it is the case that, when the wiper blade 2 bears against the window 4, contact pressure forces act on the lower part 12. Since the upper part 10 and the lower part 12 are flexible beams and the connecting elements 12 are mounted rotatably on the upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the window 4.

Owing to the construction of the embodiments described here, it is the case that, when a force is exerted on the lower part (by the window 4), the lower part bends in the direction from which the force acts. This is realized by way of the connection of the upper part 10 and of the lower part at a connecting position 34, the shape, and by way of rotary joints at the connection between the connecting elements and the upper part and lower part. A window wiper device according to embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle. In this way, a window wiper device according to the embodiments described herein has the advantage of improved adaptation to a window of a motor vehicle. In the case of a conventional window wiper blade, the upper part thereof is conventionally rigid, that is to say is not designed to be flexible.

Figure 6:
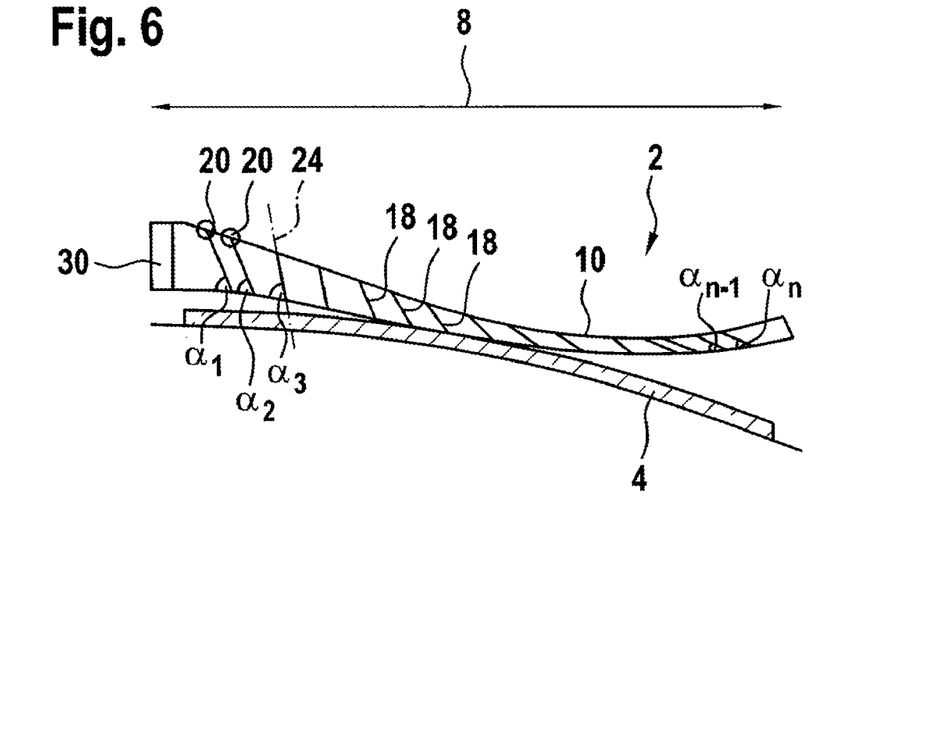
FIG. 6 is a schematic illustration of a wiper blade according to embodiments of the present invention in a basic position.
Figure 7:
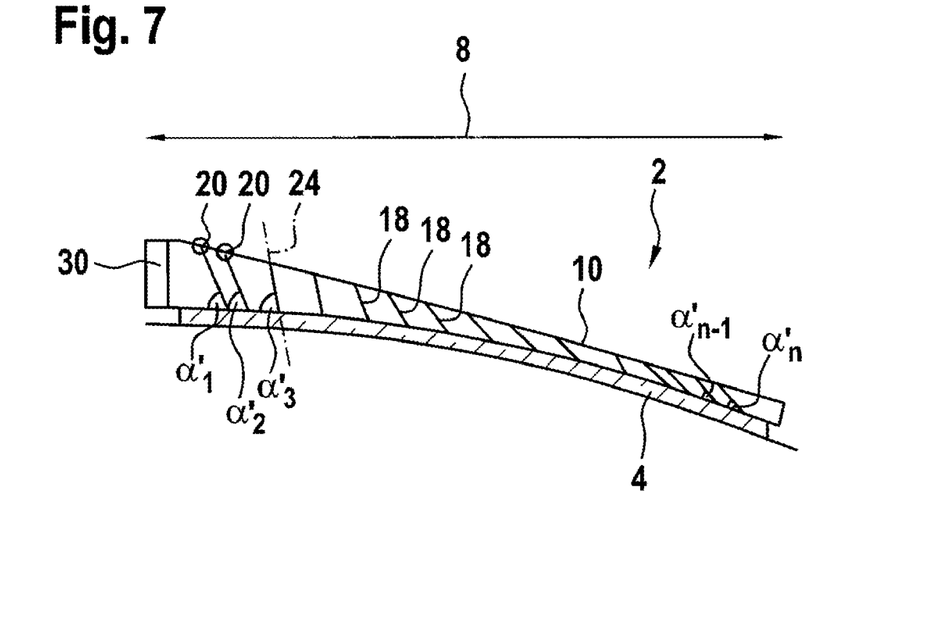
FIG. 7 is a schematic illustration of a wiper blade according to embodiments of the present invention in a position placed against a window.

FIGS. 6 and 7 show schematic illustrations of a wiper blade 2 of a window wiper device for a vehicle, in particular for a motor vehicle, in a basic position (FIG. 6), that is to say in an unloaded state, and in a position placed against a window 4 (FIG. 7), as per the embodiments described herein. The wiper blade 2 comprises an elongate upper part 10 and an elongate lower part 12 which are at least partially of flexible form. Furthermore, multiple connecting elements 18 for connecting the upper part 10 and the lower part 12 are provided, wherein the connecting elements 18 are spaced apart from one another along a longitudinal extent 8 of the wiper blade 2. The connecting elements 18 are designed to permit a movement of the upper part 10 and of the lower part 12 relative to one another with a movement component along a longitudinal extent 8 of the wiper blade 2. Furthermore, the connecting elements 18 are arranged relative to the lower part 12 such that, in an unloaded state of the wiper blade 2, an angle $\alpha_n$ of the respective longitudinal axes 24 of the connecting elements 18 relative to the lower part 12 varies, in particular varies in continuous fashion or varies monotonously or strictly monotonously, along at least a part of a longitudinal extent 8 of the wiper blade 2.

In the wiper blade illustrated in FIG. 6 in the unloaded state, the angles $\alpha_n$ of the respective longitudinal axes of the connecting elements 18 relative to the lower part 12, which vary along the longitudinal extent 8 of the wiper blade 2, are denoted by $\alpha_1, \alpha_2, \alpha_3, \ldots \alpha_n$. In a loaded state of the wiper blade, that is to say in a position placed against the window, as is illustrated by way of example in FIG. 7, the angles $\alpha_n$ of the respective longitudinal axes 24 of the connecting elements 18 relative to the lower part 12 change in relation to the unloaded state. To express this, the angles $\alpha_n$ of the respective longitudinal axes of the connecting elements 18 relative to the lower part 12 which vary along the longitudinal extent 8 of the wiper blade 2 are, in the wiper blade illustrated in FIG. 2 which is in a position placed against the window, denoted by $\alpha'_1, \alpha'_2, \alpha'_3, \alpha'_{n-1}, \alpha'_n$.

In embodiments of the window wiper device that may be combined with other embodiments, the wiper blade 2 has at least one first region in which the angle $\alpha_n$ of the longitudinal axes 24 of the connecting elements 18 relative to the lower part 12 decreases, in particular monotonously, in particular strictly monotonously, along a longitudinal extent 8 of the wiper blade 2 toward a wiper blade end. Furthermore, the wiper blade 2 may have at least one second region in which the angle $\alpha_n$ of the longitudinal axes 24 of the connecting elements 18 relative to the lower part 12 increases, in particular monotonously, in particular strictly monotonously, along a longitudinal extent 8 of the wiper blade 2 toward a wiper blade end. In embodiments illustrated by way of example in FIGS. 6 and 7, the second region of the wiper blade, in which the angle $\alpha_n$ of the longitudinal axes 24 of the connecting elements 18 relative to the lower part 12 increases along the longitudinal extent 8 of the wiper blade 2 toward a wiper blade end is arranged at an inner position of the wiper blade which is situated in the vicinity of a fastening device 30 of the wiper blade. In this way, a window wiper device can be provided which permits a particularly good adaptation to the curvature of a window. Furthermore, a substantially uniform contact pressure of the window wiper device against the window, and also a homogeneous force distribution of the window wiper device, can be provided, such that a high level of wiping quality is provided.

In embodiments of the wiper blade that may be combined with other embodiments, the connecting elements 18 are, in particular in an unloaded state of the wiper blade 2, fastened to the lower part 12 such that the longitudinal axes 24 of the connecting elements 18 run at angles $\alpha_n$ with respect to the lower part 12 which lie between a lower angle limit value $\alpha_{nu}$ and an upper limit value $\alpha_{no}$. In embodiments, the lower angle limit value is $\alpha_{nu}=10°$, in particular $\alpha_{nu}=15°$, in particular $\alpha_{nu}=20°$, and the upper angle limit value is $\alpha_{no}=80°$, in particular $\alpha_{no}=90°$, in particular $\alpha_{no}=100°$. This advantageously ensures a particularly good transmission of a force acting on the lower part to the upper part.

In embodiments of the window wiper device that may be combined with other embodiments, the connecting elements 18 are configured such that the spacing between the upper part 10 and the lower part 12 varies at least along a part of a longitudinal extent 8 of the wiper blade 2, in particular decreases in continuous fashion in a first region and increases in continuous fashion in a second region. The spacing between the upper part 10 and the lower part 12 may also, along the longitudinal extent 8 of the wiper blade 2, comprise a region in which the spacing between the upper part 10 and the lower part 12 is substantially constant along the longitudinal extent 8 of the wiper blade 2. The spacing between the upper part 10 and the lower part 12 is greater at the fastening part than at the opposite end.

In embodiments of the wiper blade that may be combined with other embodiments, the inner spacing value (facing toward the fastening part) is at least 15 mm, in particular at least 25 mm, in particular at least 35 mm. In embodiments that may be combined with other embodiments, the outer spacing value is at least 10 mm, in particular at least 12.5 mm, in particular at least 15 mm. In embodiments that may be combined with other embodiments, the mean spacing value is at least 7.5 mm, in particular at least 9 mm, in particular at least 12.5 mm.

As illustrated by way of example in FIGS. 6 and 7, in embodiments that may be combined with other embodiments, the connecting elements 18 are articulatedly connected to the lower part 12 and/or to the upper part 10. In particular, the connecting elements 18 are connected to the lower part 12 and/or to the upper part 10 by way of a first film hinge 20. The first film hinge 20 may be formed in one piece with the connecting element 18 and with the upper part 10 and/or with the lower part 12. The unipartite form of the film hinges permits simple and inexpensive production.

In embodiments of the wiper blade that may be combined with other embodiments described herein, the wiper blade comprises a first region with a first curvature $\omega<0$ and a second region with a second curvature $\omega>0$. Furthermore, in embodiments, the wiper blade may have a third region with a third curvature $\omega<0$, wherein the second region of the wiper blade with the second curvature $\omega>0$ is arranged between the first region with the first curvature $\omega<0$ and the third region with the third curvature $\omega<0$, as shown by way of example in FIG. 6. It is thus possible to provide a window wiper device with which a substantially uniform contact pressure against the window 4 can be realized. Furthermore, a window wiper device can be provided which exhibits improved adaptation to the window 4 and a high level of wiping quality.

In further embodiments, in addition to a Quickfix fastener that can be used for fin-ray wipers, in the case of which fastener the entire window wiper device is removed from a drive spindle or a fastening element on the drive spindle on the vehicle, a mechanism may be provided for the purposes of raising the wiper blade 2 of a window wiper device from the window 4 and setting said wiper blade down on said window. This further simplifies usage, for example for manual cleaning of the window 2.

Figure 8:
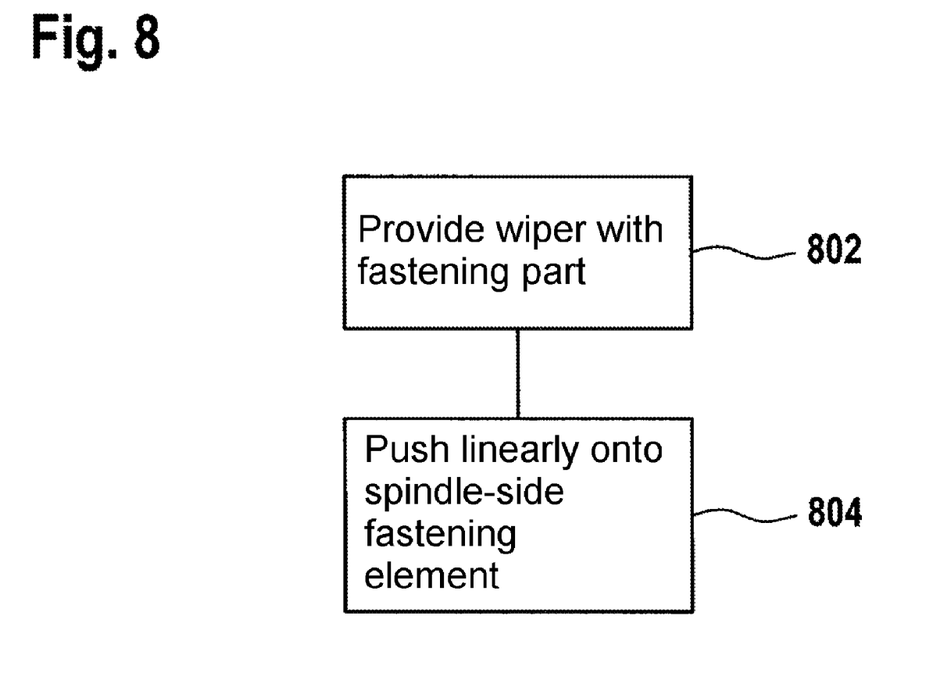
FIG. 8 is a diagram illustrating a method for the mounting of a window wiper device according to embodiments of the present invention.

FIG. 8 illustrates a method for the mounting of a window wiper device according to embodiments described here. A wiper with a wiper-blade-side fastening part is provided (see 802) and is pushed in a linear movement onto a spindle-side fastening element (see 804). In particular, the window wiper device is one which functions in accordance with the fin-ray principle, wherein a wiper-blade-side fastening part is provided by way of a cavity with an opening. Typically, the opening is situated in a first section along the longitudinal extent of the wiper blade, that is to say between the head end and a first connecting element.

What is claimed is:

1. A window wiper device (100) for a vehicle having a fastening element (50) fastened to a drive shaft, comprising a wiper blade (2) having
    an elongate upper part (10) which is at least partially of flexible form,
    an elongate lower part (12) which is at least partially of flexible form,
    multiple connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and of the lower part relative to one another with a movement component along the longitudinal extent (8) of the wiper blade (2), and a wiper-blade-side fastening part (30), wherein the wiper-blade-side fastening part (30) is detachably connectable to the fastening element by way of a linear movement, and the wiper-blade-side fastening part (30) is connectable to the fastening element such that a rotational position about an axis perpendicular to the longitudinal extent of the wiper blade and perpendicular to the linear movement is defined by a support bearing and by a further contact point wherein the wiper-blade-side fastening part has a cavity and has an opening arranged in a side wall of the cavity, and wherein the wiper-blade-side fastening part has guide elements arranged in the cavity and the contact point.

2. The window wiper device (100) as claimed in claim 1, furthermore comprising:

the fastening element (50), wherein the fastening element (50) has an actuating device (21) which is configured to releasably lock the fastening element to the wiper blade-side fastening part.

3. The window wiper device (100) as claimed in claim 2, wherein the actuating device (21) is arranged between a head part and one of the multiple connecting elements.

4. A method (200) for the mounting of a window wiper device, comprising:

providing (201) a window wiper device (100) as claimed in claim 2, pushing the wiper-blade-side fastening part (20) onto the fastening element (50) in a linear movement in order to realize an engagement action between the wiper-blade-side fastening part and the fastening element (50).

5. The method as claimed in claim 4, wherein, during the pushing-on movement, the actuating device is guided into the opening.

6. The window wiper device as claimed in claim 1, wherein the wiper-blade-side fastening part is formed in one piece.

7. The window wiper device as claimed in claim 1, wherein the wiper-blade-side fastening part is configured to be provided by way of an injection molding process.

8. The window wiper device as claimed in claim 1, wherein the wiper-blade-side fastening part is formed so as to be free from metal and/or without movable elements.

9. The window wiper device (100) as claimed in claim 1, wherein the wiper-blade-side fastening part is configured to permit a rotation relative to the fastening element about an axis perpendicular to the longitudinal extent of the wiper blade and perpendicular to the linear movement relative to the fastening element (50).

10. The window wiper device (100) as claimed in claim 9, wherein the rotation of the fastening part relative to the fastening element is restricted to an angle range of 30° or less.

11. The window wiper device (100) as claimed in claim 9, furthermore comprising:

a force-generating element, wherein the force-generating element is configured to effect the rotation relative to the fastening element about an axis perpendicular to the longitudinal extent of the wiper blade and perpendicular to the linear movement relative to the fastening element.

12. The window wiper device (100) as claimed in claim 9, furthermore comprising:

a spring, wherein the spring is configured to effect the rotation relative to the fastening element about an axis perpendicular to the longitudinal extent of the wiper blade and perpendicular to the linear movement relative to the fastening element.

13. The window wiper device (100) as claimed in claim 1, wherein the multiple connecting elements are connected at multiple upper connecting positions to the upper part and at multiple lower corresponding connecting positions to the lower part, and wherein, during the movement of the upper part and of the lower part relative to one another, the spacing between an upper connecting position and a corresponding lower connecting position is substantially constant.

14. The window wiper device (100) as claimed in claim 1, wherein the side wall faces toward a connecting element.

15. The window wiper device as claimed in claim 1, wherein the wiper-blade-side fastening part is configured to be provided by way of an injection molding process with one step.

16. The window wiper device (100) as claimed in claim 1, wherein the wiper-blade-side fastening part is configured to permit a rotation relative to the fastening element about an axis perpendicular to the longitudinal extent of the wiper blade and perpendicular to the linear movement relative to the fastening element (50), wherein the support bearing forms a fulcrum of a lever for the rotation.

17. The window wiper device (100) as claimed in claim 1, wherein the multiple connecting elements are connected at multiple upper connecting positions to the upper part and at multiple lower corresponding connecting positions to the lower part, and wherein, during the movement of the upper part and of the lower part relative to one another, the spacing between an upper connecting position and a corresponding lower connecting position is constant with a deviation of ±1 mm.

* * * * *